US006425131B2

(12) United States Patent
Crandall et al.

(10) Patent No.: US 6,425,131 B2
(45) Date of Patent: *Jul. 23, 2002

(54) METHOD AND APPARATUS FOR INTERNET CO-BROWSING OVER CABLE TELEVISION AND CONTROLLED THROUGH COMPUTER TELEPHONY

(75) Inventors: Evan Stephen Crandall, Basking Ridge; Anders Fernstedt, Hoboken; Steven Lloyd Greenspan, Scotch Plains; David M Weimer, Aberdeen, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,161

(22) Filed: Dec. 30, 1998

(51) Int. Cl.[7] ............................................. H04N 7/173

(52) U.S. Cl. ....................... 725/106; 725/109; 725/112; 725/118

(58) Field of Search ................................. 348/7, 12–13; 709/219; 370/401; 725/99, 103, 106, 109, 112, 118

(56) References Cited

U.S. PATENT DOCUMENTS

| | | | |
|---|---|---|---|
| 4,763,191 A | | 8/1988 | Gordon et al. |
| 5,278,889 A | * | 1/1994 | Papanicolaou et al. ....... 379/53 |
| 5,473,679 A | | 12/1995 | La Porta et al. |
| 5,539,449 A | | 7/1996 | Blahut et al. |
| 5,838,682 A | * | 11/1998 | Dekelbaum et al. ........ 370/401 |
| 5,907,598 A | * | 5/1999 | Mandalia et al. ...... 379/100.01 |
| 5,999,612 A | * | 12/1999 | Dunn et al. .................. 379/212 |
| 6,028,860 A | * | 2/2000 | Laubach et al. ............ 370/395 |

OTHER PUBLICATIONS www.ictv.com/overview.html.* http://www.ictv.com/overview.html Interactive Cable Television—Product overview, architecture, data sheets, specification (copy provided was printed on Nov. 17, 1998).

"Comcast and NatWest test mortgage advice on TV", Advanced Television Markets, Feb. 2, 1995, p. 14 (copy provided).

* cited by examiner

*Primary Examiner*—Andrew Faile
*Assistant Examiner*—Hai V. Tran

(57) ABSTRACT

A novel mechanism is disclosed by which a sender can direct information such as an audiovisual signal to a particular recipient's audiovisual display device, such as a cable television set and, thereby, share information between the sender and the recipient. In one embodiment of the invention, a calling party originates a telephone call and associates that telephone call with audio-visual information that exists on the caller's personal computer or on an Internet server. The called party answers the call, and can tune an associated cable television to the appropriate channel in order to view the audio-visual information. The caller can modify the audio-visual information during the call. Accordingly, the current invention ties together the telephone, cable, and IP networks in a manner that does not require large investments from cable or telephone service providers. In an alternative embodiment of the invention, a called party, such as a representative at a customer service center or an interactive voice response unit, can associate audio-visual information with the call such that the calling party can see the data on the appropriate television channel. In another embodiment, the telephone keypad can be used to move forwards and backwards through a series of audio-visual screens. In another embodiment, the cable subscriber can preset the television to a particular URL which can be viewed, but not navigated, without the telephone call.

69 Claims, 3 Drawing Sheets

METHOD AND APPARATUS FOR INTERNET CO-BROWSING OVER CABLE TELEVISION AND CONTROLLED THROUGH COMPUTER TELEPHONY

FIELD OF THE INVENTION

The present invention relates to television systems and computer systems and, more particularly, to systems for sharing information between the two.

BACKGROUND OF THE INVENTION

With the pervasive presence of voice communication devices, there is also a common need to share visual information as well. Many consumers have expressed the need to share family photographs with others, as is evidenced in part by the rapid adoption of digitized photography and photo album software. Likewise, many customers find voice-only interactions with businesses wanting, as evidenced in part by the rapid growth in visually-oriented web-based customer support. An early alternative to voice telephony has been video telephony. Video telephony allows telephone calls in which both caller and calling party can see each other via a visual display. The visual display and camera needed at each end of the call might be attached to the phone, to a PC, or to a television. The slow adoption of this form of communication is partly due to the need codiffusion of the technology (i.e. both parties need similar equipment), the expense and difficulty of managing the technology, and the lack of interest by many consumers.

The rapid development of the World Wide Web and the Internet has provided alternative avenues of sharing information. For example, IP (Internet Protocol) cobrowsing is a process that allows users to control web browsing on their personal computers (PCs) and on PCs operated by other PC users. Thus, the uniform resource locator (URL) displayed in one browser is also displayed on another browser. Depending on the application, control might be symmetric (shared by both users) or asymmetric (controlled by only one user). Other collaborative PC applications allow multiple users to simultaneously control the viewing and editing of the same document. In order to use the above methods of sharing web browsing and other applications, however, both users are obviously required to have access to a PC. Most households in the U.S. do not have PCs. PCs currently have a market penetration of roughly forty percent of U.S. households, and far fewer use such PCs for web browsing (though they may use the Internet from work).

On the other hand, approximately 65% of U.S. households subscribe to cable television and cable networks can be easily accessed by over 90% of U.S. households. Methods currently exist that allow a television set to be used as a web browser to access the Internet, e.g. WebTV. Such arrangements, however, rely on upstream data paths either through a cable or telephone connection. Navigating the World Wide Web requires a separate keyboard or a specialized remote control. Moreover, the set top box required for such arrangements tends to be costly and also tends to be difficult to use by people who are not familiar with web browsers and URLs. Accordingly, there are many people who would benefit from the ability to see certain web sites occasionally without requiring the need to browse on a regular basis. One example of such a person would be a cable TV viewer who occasionally desires information from a site such as Pointcast but otherwise is not interested in web browsing or computer use. Another example is a personal computer user who desires to send a graphic image to a person who has access to only a cable TV, e.g. a PC-enabled family who wants to send a picture of a newborn baby while simultaneously talking to the faraway grandparents who only have access to cable TV and a telephone line.

The discussion above suggests three recent market trends that are relevant as background to the current invention: (1) the slow growth of video telephony and WebTV; (2) the development and growth of Internet-based cobrowsing techniques; and (3) the rapid growth of methods that allow consumers to create digitized photographs, store them in a personal computer, and share them via the Internet with close friends and relatives. Accordingly, given these three market trends, it would be advantageous to devise a novel mechanism for directing data (such as an audiovisual signal) across a data network (such as the Internet) to a particular cable TV.

SUMMARY OF THE INVENTION

The present invention presents a novel mechanism by which a sender can direct information such as an audiovisual signal to a particular recipient's audiovisual display device, such as a cable television set and, thereby, share information between the sender and the recipient. In one embodiment of the invention, the calling party originates a connection on a voice communication network, e.g. a telephone call, and associates that telephone call with audio-visual information that exists on the caller's computer or on an Internet server. The called party answers the call, and can tune an associated cable television to the appropriate channel in order to view the audio-visual information. The caller can modify the audio-visual information during the call. Accordingly, the current invention ties together the telephone, cable, and IP networks in a manner that does not require large investments from cable or telephone service providers beyond what is already being invested to support Internet-access with cable.

The key concept is the association between two otherwise independent channels of information: one used for multi-way voice and the other for data. Information in the setup instructions for the multi-way voice-enabled channel is used to address the recipients of data (who are also participants in the voice conversation) and in-band signaling or an implicit criteria such as duration of the conversation is used to grant permission to receive data over the data channel. Notably, the conversation can continue while the data is being transmitted.

In an alternative embodiment of the invention, a called party, such as a representative at a customer service center or an interactive voice response unit, can associate audio-visual information with the call such that the calling party can see the data on the appropriate television channel. In another embodiment, the telephone keypad can be used to move forwards and backwards through a series of audio-visual screens. In another embodiment, the cable subscriber can preset the television to a particular URL which can be viewed, but not navigated, without the telephone call.

These and other aspects of the invention will become apparent from the drawings and the detailed description.

DETAILED DESCRIPTION

Figure 1:
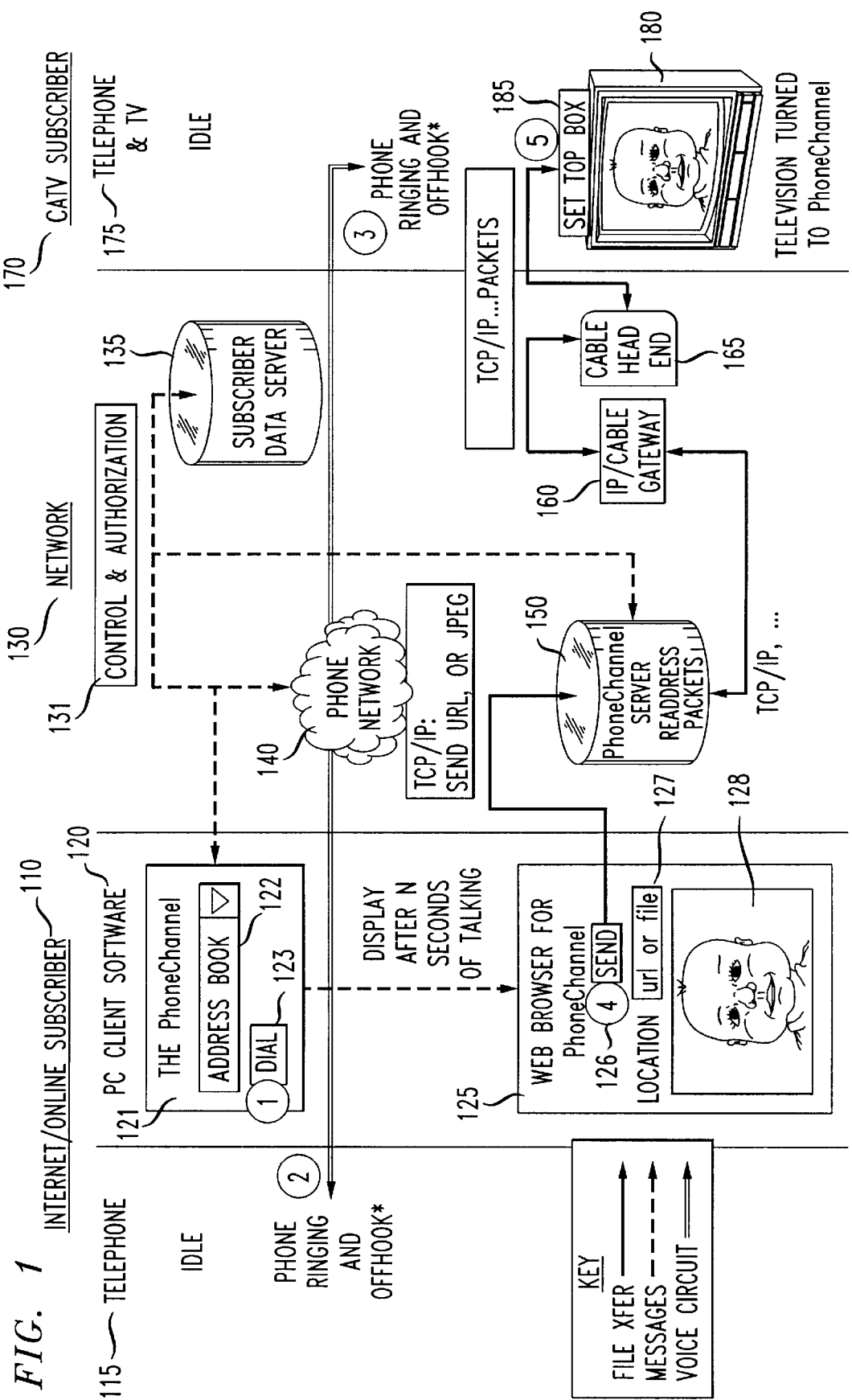
FIG. 1 is an overall block diagram of a integrated telephony/data/television system configured in accordance with an embodiment of the invention.

A preferred embodiment of the present invention is disclosed in the block diagram of FIG. 1. An Internet/online subscriber 110 with access to a "control" computer executing client software 120 and a telephone 115 wishes to communicate with a recipient who is a community access television (CATV) subscriber 170 and who also has a telephone 175. An integrated telephony/data/television network 130 connects the sender to the recipient. Known security and encryption mechanisms can be incorporated into the signaling protocols used to implement the present invention.

The control computer (which may be a personal computer or an automated interactive server of some kind) may be connected to a data network, which for purposes of illustration is a connectionless packet-switched public data network (PDN) such as the Internet. The sender's control computer is connected across the data network to a server computer 150 which facilitates the broadcast of the information to the recipient. The client software 120 illustrated in FIG. 1 comprises a computer program 121 which permits the user to choose a recipient from an address book 122 and dial a voice connection to the recipient by selecting button 123. The client software 120 also comprises a computer program 125 that operates like a World Wide Web browser. The user can choose information to be transmitted to the recipient by inputting a file name or URL in field 127. The information is displayed in window 128 and can be transmitted for broadcast by selecting button 126.

The telephones 115, 175 are connected to a voice communication network 140. The telephones can be conventional voice telephone sets with standard local loop connections to nodes within respective local exchange carrier (LEC) networks and between which conventional voice communication paths can be established through an interexchange carrier and/or LEC network. The telephone network may be a conventional connection-oriented telephone network, such as the PSTN, or some other type of network such as an IP-based network. Accordingly, the voice communication network can be separate from the data network, or can be a part of the data network. Regardless, control and authorization signal pathways 131 connect the networks and provide access to a database of subscriber information 135 which includes information regarding the recipient.

The recipient of the shared data 170 may be a CATV subscriber with a conventional television set 180 connected to some coaxial cable distribution network. In FIG. 1, the television 180 is shown connected through a set top box 185 to a cable head end 165 of the cable distribution network. The cable network can be one-way (only a down stream broadcast path) or two-way cable (with a return path). A portion of the bandwidth can be reserved for entertainment channels from some downstream entertainment channel source. The cable head end 165 is connected to an IP/cable gateway 160 which provides access to the data network. The cable head end and the interface unit can be physically located in the same or different locations. The digital signals from the Internet are transformed into whatever type of signal utilized by the television 180 for display, e.g. the standard analog NTSC-modulated RF carrier, an MPEG-compressed digital data stream, or any other format. Regardless of form, specific television channels can be allocated to the present invention or the spectrum devoted to IP communication can be used.

The system permits the control computer to be used to (a) set up a telephone call among two or more telephone sets, and (b) for the duration of the telephone call, display audio-visual material on the cable televisions owned by the called parties. In one embodiment of the invention, the information sent to a particular channel of the CATV subscriber's television is a reformatted version of the content of a URL on the Internet/Cable server and associated with the subscriber's telephone number. Similarly, a direct data channel can be provided between the IP gateway and the Internet-enabled cable head end so that a computer attached to the Internet could directly send audio-visual signals to a cable television using the Internet Protocol without necessarily using HTML. Known software techniques for screen sharing can be used to implement such a system.

Figure 3:
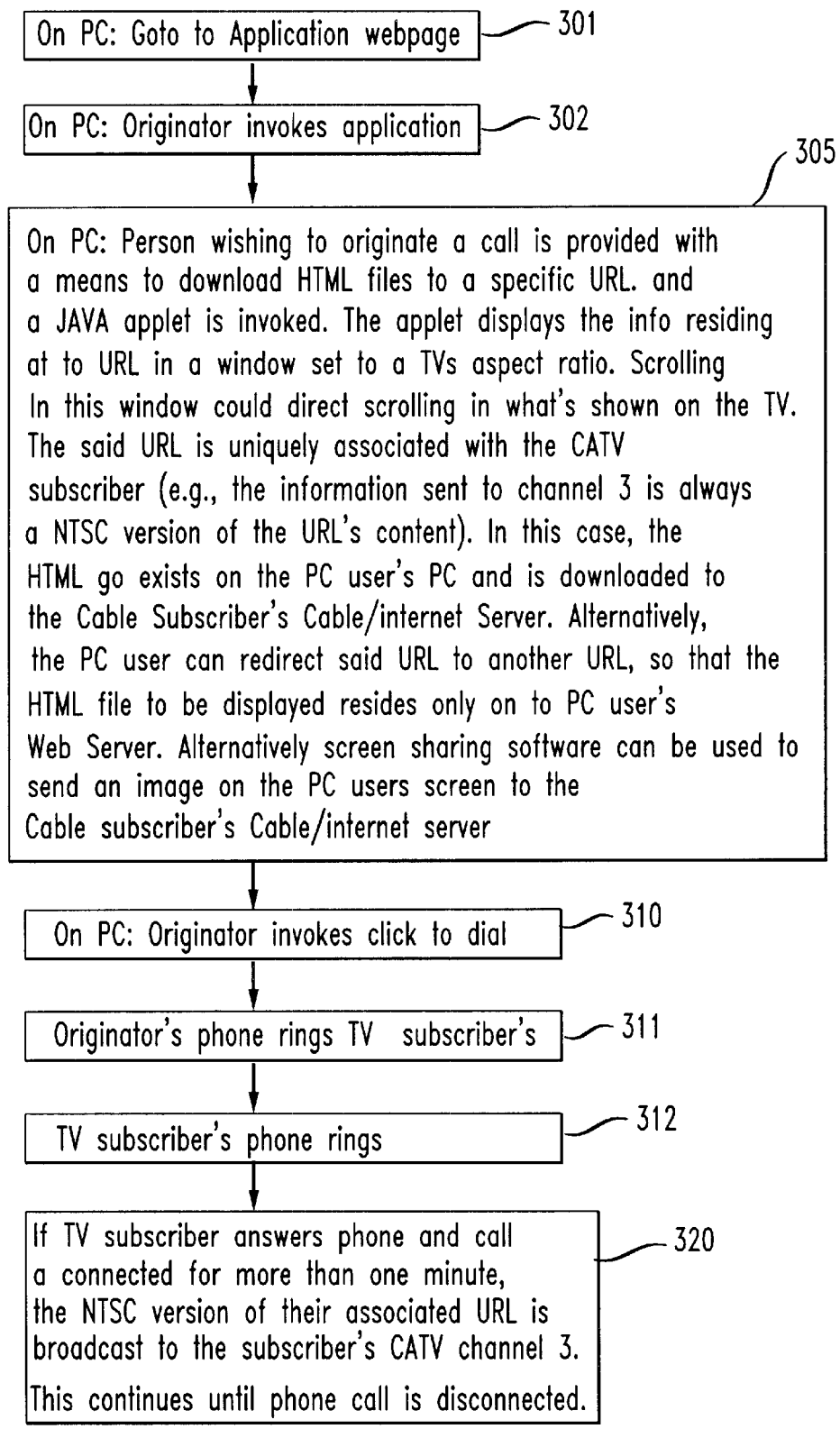
FIG. 3 is a flowchart setting forth the sequence of steps implementing one of the methods disclosed of sending an audiovisual HTML document to a cable television associated with a telephone number.

With reference to FIG. 3, a flowchart is shown which sets forth a sequence of steps implementing one of the methods disclosed of sending an audiovisual HTML document to a cable television associated with a telephone number. The steps disclosed are merely exemplary and are not meant to limit the nature of the invention. At step 301, a computer user, utilizing a conventional Internet browser, first accesses a webpage dedicated to the instant application. At step 302, the user invokes the application, which may provide some login process to confirm identity.

At step 305, the user wishing to send the audiovisual HTML document to a particular CATV subscriber is provided with a means to download the HTML file to a specific network and subnetwork address, e.g. a URL. This address is uniquely associated with the CATV subscriber, e.g. the information sent to a particular channel of the CATV subscriber's television is an NTSC version of the address's content. An applet written in Java can be invoked that displays the information residing at the URL to the user in a window set to a television's aspect ratio. Scrolling in the window can direct the scrolling of what is displayed on the television. The HTML file, which exists on the user's computer is downloaded to the cable subscriber's cable/internet server. Alternatively, the computer user can be provided with means to redirect the above URL to another URL, so that the HTML file displayed on the CATV subscriber's television resides only on some other Web server. Alternatively, screen sharing software can be utilized to send an image displayed on the user's computer screen to the cable subscriber's cable/internet server. Rather than an image, any other type of data, such as audio-visual material, can be encoded, sent through the Internet (or an intranet) and decoded to be broadcast on the cable subscriber's television.

At step 310, the user can then initiate a telephone call to the CATV subscriber. In a preferred embodiment of the invention, the user utilizes an Internet-based telephonic connection service, such as AT&T's Click-2-Dial. Such a service would permit the user to input the calling number and the destination number, and this information would then be transmitted across the data network to a connection server which would establish a telephonic connection to both the user and the destination. The user's telephone would ring at step 311 and the CATV subscriber's telephone would also ring at step 312. As both parties answer their respective telephones, the connection server bridges the two connections permitting the parties to communicate. The details of such a process are set forth in co-pending commonly-assigned U.S. patent application Ser. No. 09/038,149, to Bennett et al., filed on Mar. 19, 1997.

After the TV subscriber answers the telephone call, a version of the URL formatted for the subscriber's television is broadcast on the designated CATV channel at step 320. As described above, the signal can be any type of signal that may be utilized by a television for video display, regardless of the form, including the standard NTSC-modulated RF carrier, an MPEG-compressed digital data stream, or any other format. The broadcast can commence immediately, after a designated period of telephone connection time (e.g. a minute), after the called party has explicitly accepted the cable transmission (e.g. through touch tone), or after some other condition has been met. Explicit acceptance could be accomplished using the touch-tone keypad on the called party's telephone. The calling and called parties can be permitted to interact with the displayed material: either through the calling party's computer or through the use of the touch tone keypad on either the called or calling party's telephone. Thus, the visual display can be altered at the direction of the cable TV viewer via the telephone touch-tone. Scrolling of the CATV image could also be done via the called party's television remote control.

Figure 2:
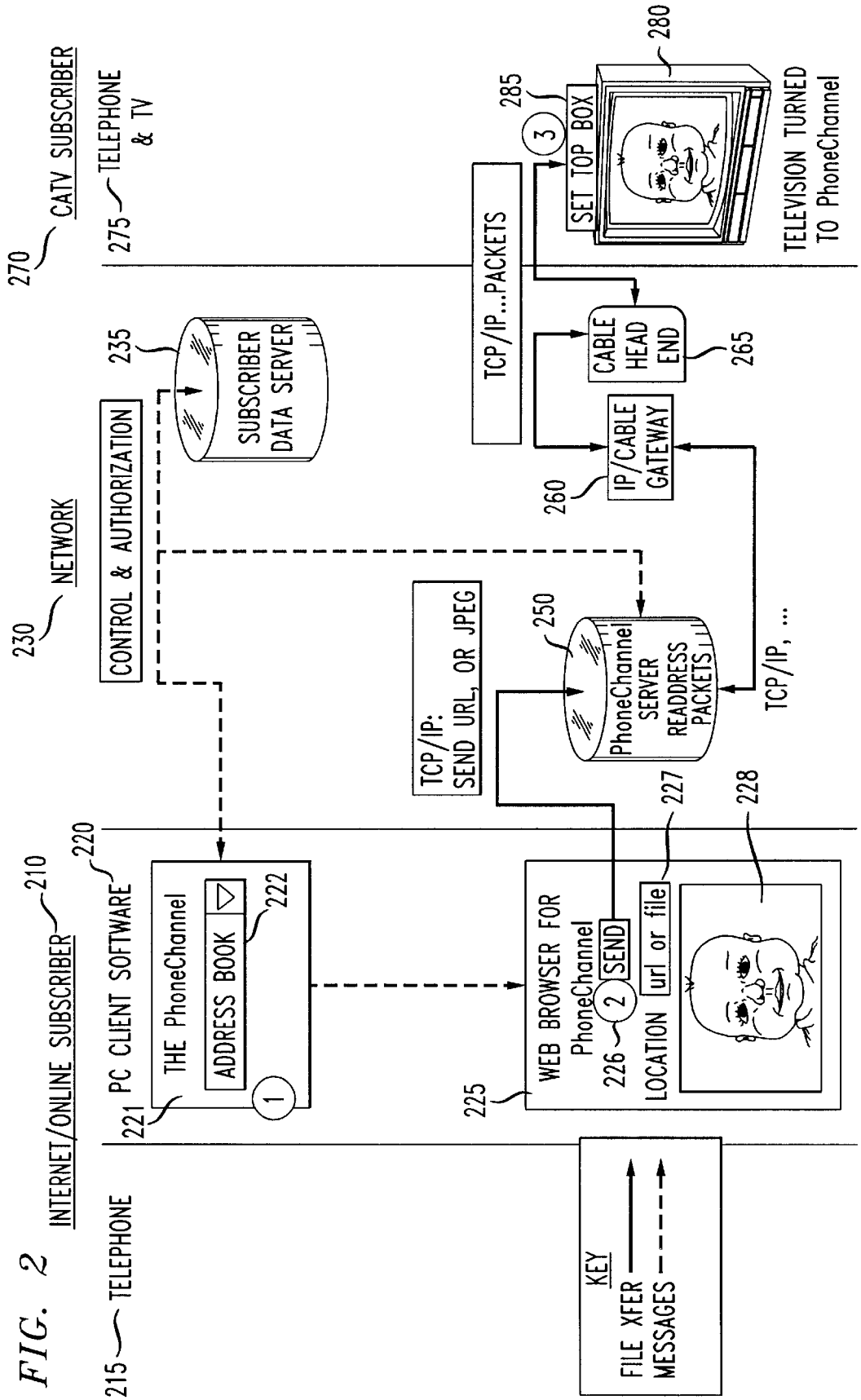
FIG. 2 is an overall block diagram of a integrated telephony/data/television system configured in accordance with another embodiment of the invention.

The broadcast transmission to the subscriber's CATV can continue until the phone call is disconnected. Likewise, the called party can also be allowed to continue viewing the information after the connection with the calling party has disconnected. An example of such a system, after the voice communication connection has ended, is shown in FIG. 2. The called party could continue to interact with the World Wide Web and the web page even after the calling party disconnects, for example, by using the telephone's touch-tone.

The figures and the description above refer to cable television, although the concept can be easily generalized to practically any data service such as satellite TV, or MMDS broadcast TV, or even digital radio. Similarly, the concept can be generalized to allow data to be sent to any audiovisual display device, e.g. the receiving party could be using a personal data assistant and could receive the telephone call and then receive the "pushed" data, as described above. For purposes of the present invention, a personal data assistant can be any intelligent consumer device including a personal computer which is manufactured for Internet browsing or for IP reception. The device can be wired or can be equipped for wireless reception from the network.

A second incoming call to the CATV subscriber attempting to present audiovisual information would normally receive a "busy" signal, unless the subscriber has call waiting. In such a case, means can be provided which would cause a synchronized switching between the respective audiovisual materials when the called party switches between the telephone calls. Likewise, a call that is forwarded would also allow the audio-visual information to be forwarded to the cable TV of the receiving household or office. Thus, the above service can be generalized to include CLASS services and their business analogs, e.g. 3-way calling.

The above-mentioned Click-2-Dial permits Internet-based telephonic conference calls. Similarly, each cable subscriber connected using such an audio conference call feature can also, using the above method, be allowed to simultaneously view the displayed information on their cable televisions. Furthermore, the above concept can be generalized to multiple Internet users, so that a calling party can allow a called party to view particular URLs on their own personal computers (not their cable television) during, and only during, a telephone call (unless the image is explicitly saved by the receiving party)—or during and after (but not prior to) the call.

The basic infrastructure that is disclosed could support many other third party applications as well as the above illustrative application. For example, the cable subscriber can originate the call to an interactive voice response system (IVR) and instruct said system to allow viewing of specific audio-visual material through the subscriber's cable television. One example would be if a cable subscriber called directory assistance and used the above method to view telephone directory listings, including related advertisements or information. The directory listings could be residential or commercial; they could represent a selection of those listings most called or received by the subscribing household, or the most recently called or received phone numbers by the subscribing household. The subscriber could select one or several listings and instruct the telephone network to complete a call to the selected telephone numbers.

Therefore, as seen from this example, a request to send information to the cable television of a telephone call participant can be made whether or not the person issuing the request has a computer or other IP-compliant device. Thus, either the calling or called parties can issue a request to send information to the cable TV by using any telephone device, e.g. a mobile phone. Moreover, devices other than computers can be used to send information through the Internet to the designated cable television. For example, a fax machine can send a fax to an internet server which translates the fax image into IP messages. Using the telephone number supplied by the fax machine user, the IP messages are then sent via the Internet to the cable head end associated with that telephone number and, accordingly, to the appropriate cable television.

Provision can be made in the customer premise equipment (CPE) to store the audio-visual information for later recall by the television subscriber, for printing or sending to a fax machine during or after the call, or for forwarding to another television subscriber via the above-described phone call mechanism. The stored audio-visual information can be the actual image, or it can be a URL address of the information. The receiving CPE can also be configured to receive control information from the sender of the information. This control information can be used to restrict the storage of the information at the receiver's premises and thereby protect intellectual property rights. Restrictions could be enforced forbidding the storage of any of the information, permitting only the URL to be stored, permitting only received image to be stored, or permitting the storage for later viewing but forbidding the printing, faxing, or retransmission to another device. Except for industry-wide solutions, there is currently no way to prevent a television subscriber from video-taping the received signal. The communications industry, however, is currently working on devices that restrict the taping of pay-per-view television, and such technology can be adopted in the above invention to further prevent illegal copying.

It is to be understood that the above embodiments and their variations are not mutually exclusive but can be combined in various ways to provide a service offering for a subscriber customer. Moreover, variations and modifications to the above-described preferred embodiment will be apparent to one skilled in the art that are also within the spirit and scope of the invention as set forth in the claims below.

What is claimed is:

1. A method of sharing information between a sender with access to a data network and a recipient's audiovisual display device, the recipient being identified by a voice communication network address and a data communication network address, the method comprising the steps of:

pre-associating the recipient's voice communication network address with the recipient's data communication network address;

establishing an initial voice connection on a voice communication network between the sender and the recipient;

associating the connection with information to be sent across the data network to the recipient's audiovisual display device based on the pre-association between the recipient's voice communication network address with the recipient's data communication network address; and initiating a broadcast of the information to the recipient's audiovisual display device.

2. The method of claim 1 wherein the recipient's reception of the broadcast begins after the recipient authorizes the broadcast.

3. The method of claim 2 wherein the recipient authorizes the broadcast by remaining on the connection for a designated period of time.

4. The method of claim 2 wherein the recipient authorizes the broadcast by transmitting a signal across the voice communication network.

5. The method of claim 2 wherein the recipient authorizes the broadcast by transmitting a signal across the data network.

6. The method of claim 1 further comprising the steps of:

receiving input from the recipient or sender;

changing the information broadcast to the recipient's audiovisual display device based on the input from the recipient or sender.

7. The method of claim 6 wherein the input is a signal transmitted across the voice communication network.

8. The method of claim 6 wherein the input is a signal transmitted across the data network.

9. The method of claim 7 wherein the signal is a DTMF signal.

10. The method of claim 7 wherein the signal is a voice command.

11. The method of claim 1 wherein the sender is an automated interactive response system.

12. The method of claim 1 further comprising the step of ending the broadcast of the information to the recipient's audiovisual display device when the connection between the sender and the recipient ends.

13. The method of claim 12 wherein the broadcast is ended by overwriting the broadcast with a default transmission.

14. The method of claim 1 wherein the connection is established to a plurality of recipients, each recipient with an audiovisual display device capable of receiving the information broadcast.

15. The method of claim 1 further comprising the step of storing the broadcast of the information to the recipient's audiovisual display device.

16. The method of claim 1 wherein the information is an audiovisual signal.

17. The method of claim 1 wherein the information is a Web page.

18. The method of claim 1 wherein the information is a facsimile.

19. The method of claim 1 wherein the audiovisual display device is a television set.

20. The method of claim 1 wherein the audiovisual display device is a cable television set.

21. The method of claim 1 wherein the audiovisual display device is a personal data assistant.

22. A computer readable medium containing executable program instructions for sharing information between a sender with access to a data network and a recipient's audiovisual display device, the recipient being identified by a voice communication network address and a data communication network address, the medium comprising:

means for associating the recipient's voice communication network address with the recipient's data communication network address;

means for receiving notification that an initial voice connection has been established between the recipient and the sender on a voice communication network;

means for receiving from the sender a designation of information associated with the connection; and means for initiating the broadcast of the information to the recipient's audiovisual display device.

23. The computer readable medium of claim 22 further comprising means for initiating the connection on the voice communication network.

24. The computer readable medium of claim 22 wherein the broadcast is initiated by sending a signal to a server attached to the data network and capable of broadcasting the information to the recipient's audiovisual display device.

25. The computer readable medium of claim 22 further comprising means for receiving the recipient's authorization for broadcast.

26. The computer readable medium of claim 25 wherein the recipient authorizes the broadcast by remaining on the connection for a designated period of time.

27. The computer readable medium of claim 25 wherein the recipient authorizes the broadcast by transmitting a signal across the voice communication network.

28. The computer readable medium of claim 25 wherein the recipient authorizes the broadcast by transmitting a signal across the data network.

29. The computer readable medium of claim 22 further comprising means for ending the broadcast of the information to the recipient's audiovisual display device when the connection between the sender and the recipient ends.

30. The computer readable medium of claim 29 wherein the broadcast-ending means further comprises means for overwriting the broadcast with a default transmission.

31. The computer readable medium of claim 22 further comprising means for storing the broadcast of the information to the recipient's audiovisual display device.

32. The computer readable medium of claim 22 wherein the information is an audiovisual signal.

33. The computer readable medium of claim 22 wherein the information is a Web page.

34. The computer readable medium of claim 22 wherein the designation of information is a URL.

35. The computer readable medium of claim 22 wherein the information is a facsimile.

36. The computer readable medium of claim 22 wherein the audiovisual display device is a television set.

37. The computer readable medium of claim 22 wherein the audiovisual display device is a cable television set.

38. The computer readable medium of claim 22 wherein the audiovisual display device is a personal data assistant.

39. A computer readable medium containing executable program instructions for sharing information between a sender with access to a data network and a recipient's audiovisual display device, the recipient being identified by a voice communication network address and a data communication network address related to the recipient's audiovisual display device, the medium comprising:

means for associating the recipient's voice communication network address and data communication network address related to the recipient's audiovisual display device;

means for designating information to be broadcast to the recipient's audiovisual display device;

means for associating the information with a connection to be established across a voice communication network with the recipient; and means for sending the designation of information to a server capable of initiating the broadcast.

40. The computer readable medium of claim 39 further comprising:

means for receiving input from the recipient;

means for changing the information to be broadcast to the recipient's audiovisual display device based on the input from the recipient.

41. The computer readable medium of claim 40 wherein the recipient's input is a signal transmitted across the voice communication network.

42. The computer readable medium of claim 41 wherein the signal is a DTMF signal.

43. The computer readable medium of claim 41 wherein the signal is a voice command.

44. The computer readable medium of claim 40 wherein the recipient's input is a signal transmitted across the data network.

45. The computer readable medium of claim 39 wherein the sender is an automated interactive response system.

46. The computer readable medium of claim 39 wherein the connection is established to a plurality of recipients, each recipient with an audiovisual display device capable of receiving the information broadcast.

47. The computer readable medium of claim 39 wherein the information is an audiovisual signal.

48. The computer readable medium of claim 39 wherein the information is a Web page.

49. The computer readable medium of claim 39 wherein the designation of information is a URL.

50. The computer readable medium of claim 39 wherein the information is a facsimile.

51. The computer readable medium of claim 39 wherein the audiovisual display device is a television set.

52. The computer readable medium of claim 39 wherein the audiovisual display device is a cable television set.

53. The computer readable medium of claim 39 wherein the audiovisual display device is a personal data assistant.

54. An apparatus comprising:

means for receiving information broadcast on a data network and associated with an initial connection between a sender and a recipient on a voice communication network;

means for identifying that a broadcast is directed to the recipient and for decoding that broadcast;

means for rejecting broadcasts not intended for the recipient; and means for transmitting the information to an audiovisual display device, wherein a previously established association is made between a voice communication network address of the recipient and a data communication network address of the recipient, the data communication network address related to the audiovisual display device.

55. The apparatus of claim 54 further comprising means for receiving notification that the recipient authorizes the broadcast.

56. The apparatus of claim 54 further comprising means for storing the information broadcast to the audiovisual display device.

57. The apparatus of claim 54 further comprising means for printing the information broadcast to the audiovisual display device.

58. The apparatus of claim 54 further comprising means for forwarding the information to another audiovisual display device.

59. The apparatus of claim 54 further comprising means for ending the transmission of the information to the recipient's audiovisual display device by overwriting the broadcast with a default transmission.

60. The apparatus of claim 54 wherein the information is an audiovisual signal.

61. The apparatus of claim 54 wherein the information is a Web page.

62. The apparatus of claim 54 wherein the information is a facsimile.

63. The apparatus of claim 54 wherein the audiovisual display device is a television set.

64. The apparatus of claim 54 wherein the audiovisual display device is a cable television set.

65. The apparatus of claim 54 wherein the audiovisual display device is a personal data assistant.

66. A method for sharing information, the method comprising the steps of:

associating an initial voice connection previously established over a voice communication network with information to be provided across a data network to at least one recipient; and providing the information to the at least one recipient, wherein each recipient is identified by a voice communication network address which has been previously associated with a data network address belonging to the recipient.

67. A method of sharing information, the method comprising the steps of:

establishing an association between at least one potential recipient of multimedia information and a voice communication identifier and a data network identifier which both belong to the recipient;

providing an originating voice communication connection over a voice network between a sender and at least one recipient of multimedia information;

associating the voice connection with multimedia information to be provided across a data network to the at least one recipient; and providing the multimedia information to the at least one recipient over the data network, wherein the data network is separate from the voice network.

68. A method comprising the steps of:

establishing an initial voice communication connection over a voice network between a sender and at least one recipient of multimedia information;

associating the voice connection with multimedia information to be provided across a data network to the at least one recipient, wherein the association is performed according to a previously established relationship between the recipient's voice network ID and the data network ID;

established a connection over the network between a sender and at least one recipient of multimedia information; and providing the multimedia information to the at least one recipient over the data network.

69. A method comprising the steps of:

determining if a first user and at least one second user have established an initial voice communication;

associating voice communication with multimedia information to be provided across a data network to the at least one second user based on a predetermined relationship between the second user's voice network address and data network address; and providing the multimedia information to the at least one second user over the data network, wherein the at least one second user receives the multimedia information on a device which is distinct from the device the users established the initial voice communication on.

* * * * *